(12) United States Patent
Danielsson et al.

(10) Patent No.: US 9,172,589 B2
(45) Date of Patent: Oct. 27, 2015

(54) METHOD FOR CONFIGURING A DISTRIBUTED AVIONICS CONTROL SYSTEM

(75) Inventors: Torkel Danielsson, Linkoping (SE); Anders Pettersson, Linkoping (SE)

(73) Assignee: SAAB AB, Linkoeping (SE)

( * ) Notice: Subject to any disclaimer, the term of this patent is extended or adjusted under 35 U.S.C. 154(b) by 370 days.

(21) Appl. No.: 13/704,451

(22) PCT Filed: Jul. 5, 2010

(86) PCT No.: PCT/SE2010/050779
§ 371 (c)(1),
(2), (4) Date: Feb. 14, 2013

(87) PCT Pub. No.: WO2012/005637
PCT Pub. Date: Jan. 12, 2012

(65) Prior Publication Data
US 2013/0159477 A1 Jun. 20, 2013

(51) Int. Cl.
| | | |
|---|---|---|
| H04L 29/08 | (2006.01) | |
| G06F 9/50 | (2006.01) | |
| G06F 9/48 | (2006.01) | |
| G06F 9/54 | (2006.01) | |

(52) U.S. Cl.
CPC ........ *H04L 29/08981* (2013.01); *G06F 9/4887* (2013.01); *G06F 9/5066* (2013.01); *G06F 9/546* (2013.01)

(58) Field of Classification Search
CPC ..... G06F 9/4887; G06F 9/5066; G06F 9/546; H04L 29/08981
See application file for complete search history.

(56) References Cited

U.S. PATENT DOCUMENTS

| | | | |
|---|---|---|---|
| 6,567,840 B1 | 5/2003 | Binns et al. | |
| 7,320,088 B1 * | 1/2008 | Gawali et al. | 714/6.1 |
| 7,343,622 B1 | 3/2008 | Woodall | |
| 2002/0120663 A1 * | 8/2002 | Binns | 709/103 |
| 2006/0230339 A1 * | 10/2006 | Achanta et al. | 715/513 |
| 2007/0079169 A1 | 4/2007 | Gabarre et al. | |
| 2008/0192772 A1 * | 8/2008 | Kinstler | 370/468 |
| 2008/0215927 A1 * | 9/2008 | Roussel | 714/47 |
| 2008/0222303 A1 * | 9/2008 | Archer et al. | 709/238 |

(Continued)

FOREIGN PATENT DOCUMENTS

| | | |
|---|---|---|
| EP | 1506478 A2 | 2/2005 |
| WO | WO 2005/069155 A2 | 7/2005 |

OTHER PUBLICATIONS

European Patent Office, Extended European Search Report for Application No. 10854506.2, Jul. 11, 2014, 7 pages, European Patent Office, Germany.

(Continued)

*Primary Examiner* — Brian J Gillis
*Assistant Examiner* — Gil H. Lee
(74) *Attorney, Agent, or Firm* — Alston & Bird LLP

(57) ABSTRACT

The present invention relates to a method for configuring synchronous table-driven operations of a distributed avionics control system comprising a plurality of processing nodes (S1-S4) interconnected in a network (2). The method comprises the steps of providing a global timing meta-data component (X4), a plurality of application meta-data components (X51-X52), and a node assignment meta-data component (X 2). The method also comprises the steps of detecting data communication paths, detecting communication requirements, generating a system schedule meta-data component, generating a system configuration data and providing the system configuration to the distributed avionics control system.

13 Claims, 7 Drawing Sheets

(56) References Cited

U.S. PATENT DOCUMENTS

2009/0005916 A1  1/2009  Wainwright et al.
2009/0300615 A1  12/2009  Andrade et al.
2010/0325635 A1* 12/2010  Pree et al. .................... 718/103

OTHER PUBLICATIONS

International Searching Authority, International Search Report for International Application No. PCT/SE2010/050779, mailed Mar. 3, 2011, 4 pages, The Swedish Patent and Registration Office, Sweden.

International Preliminary Examining Authority, International Preliminary Report on Patentability for International Application No. PCT/SE2010/050779, including Applicant's May 5, 2012 response to the Written Opinion of Mar. 3, 2011, dated Jun. 4, 2012, 25 pages, The Swedish Patent and Registration Office, Sweden.

International Searching Authority, International Search Report and Written Opinion for International Application No. PCT/SE2010/050779, mailed Mar. 3, 2011, 12 pages, The Swedish Patent and Registration Office, Sweden.

* cited by examiner

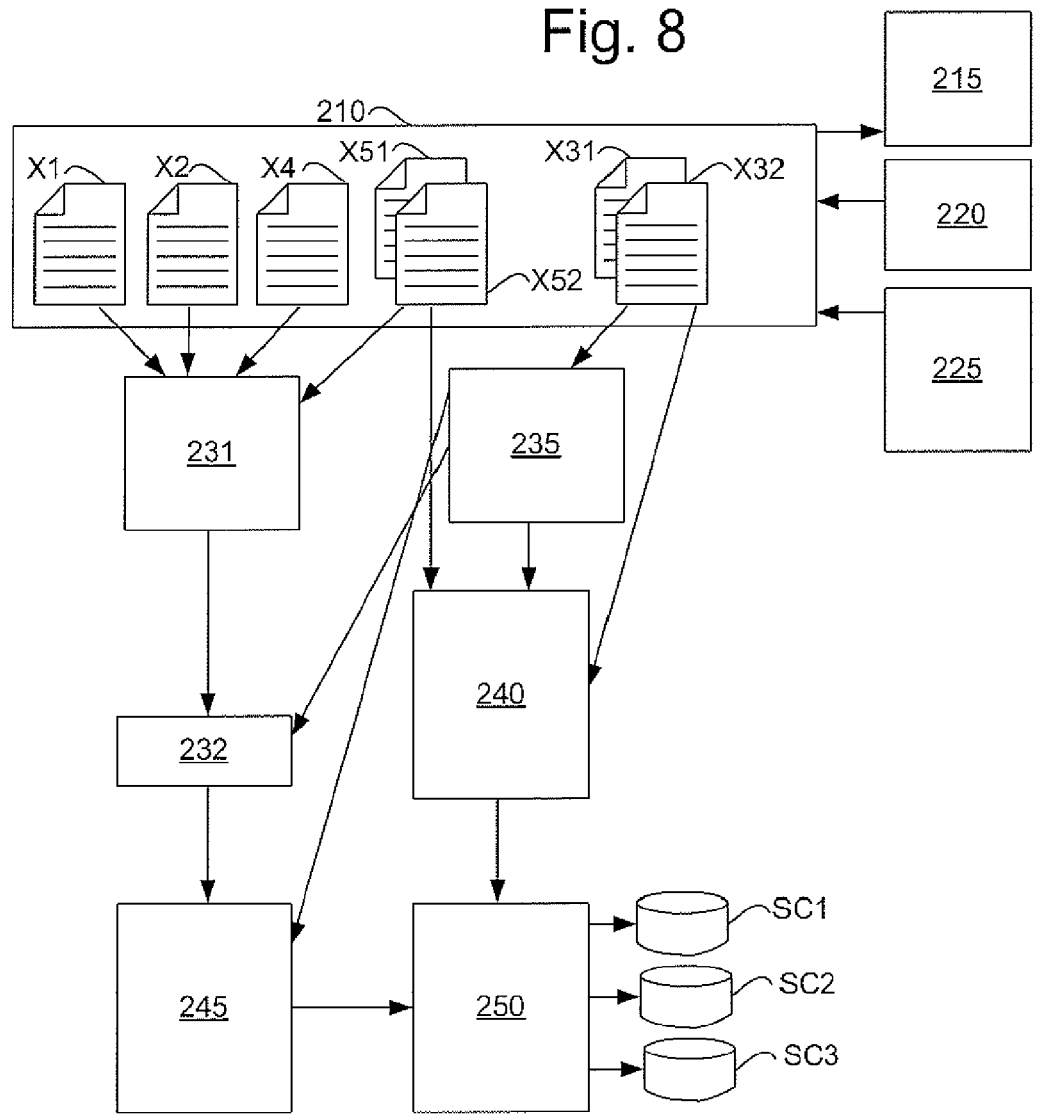

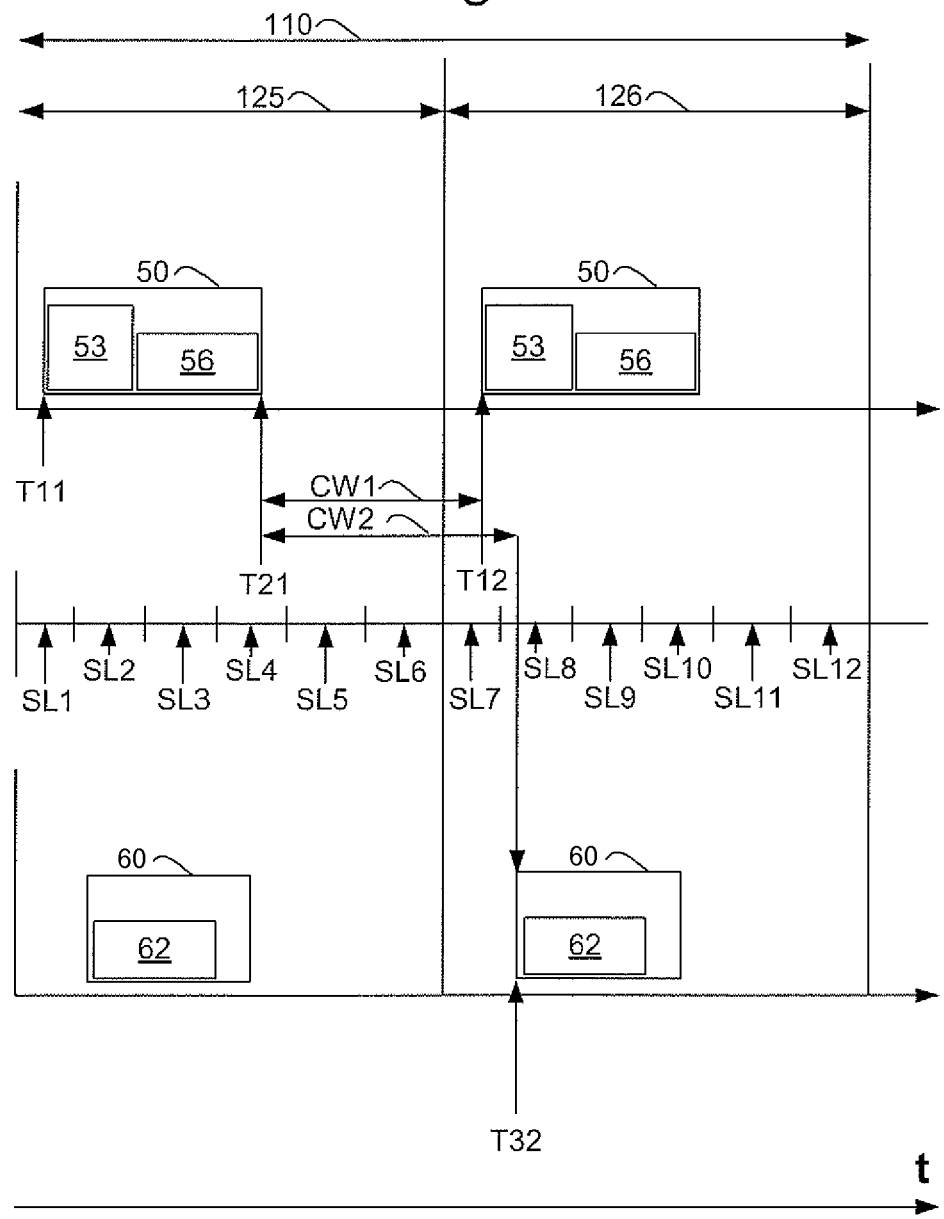

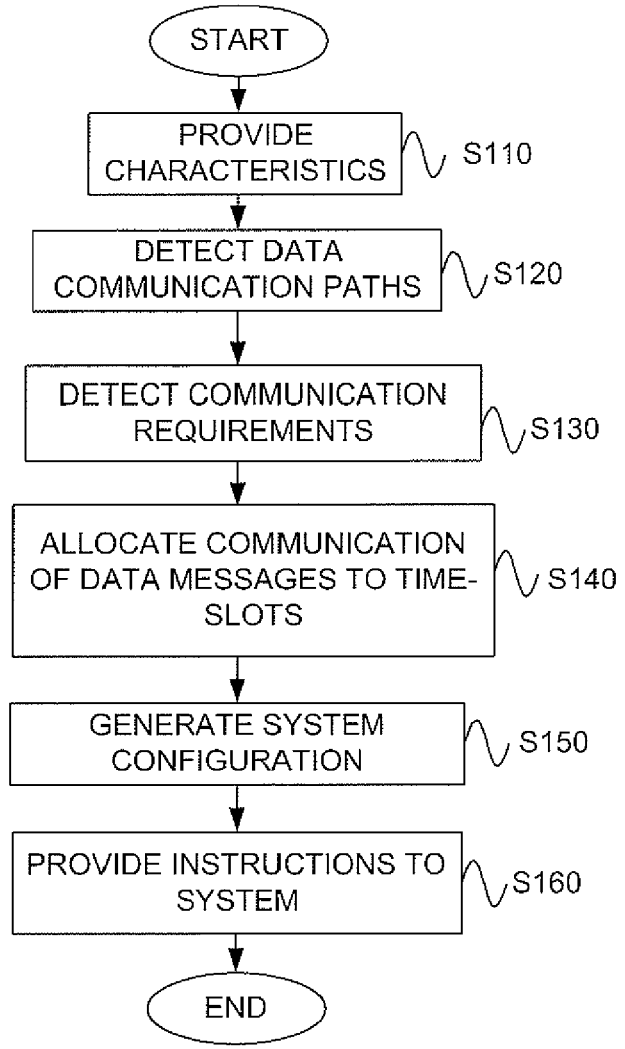

METHOD FOR CONFIGURING A DISTRIBUTED AVIONICS CONTROL SYSTEM

CROSS REFERENCE TO RELATED APPLICATIONS

This application is a national stage application, filed under 35 U.S.C. §371, of International Application No. PCT/SE2010/050779, filed Jul. 5, 2010, the contents of which are hereby incorporated by reference in its entirety.

BACKGROUND OF THE INVENTION

1. Related Field

The present invention relates to a method for control of avionics.

Furthermore, the invention relates to software adapted to perform steps of the control method when executed on a computer.

2. Description of Related Art

In embedded control systems of today, developments in digital technology have enabled complex functionality. However as a direct result from the development, the need of additional system capacity provided by software and various components such as sensors, processors, display units, data buses and memory units is increasing.

Apart from implementing more functionality and interconnectivity in control systems, using less Space Weight-and-PoWer, (SWaP) and a reduced number of cabling are further important drivers. Updates of embedded hardware and software during a product's life span make adaptability and modularity another interesting design parameter. Other incentives include achieving cost efficient development, production and maintenance, Where one possible route is to implement Commercial-Of-The-Shelf (COTS) technology instead of expensive specialized technology.

Real-time systems for safety critical control applications, wherein typically data from sensor/s are acquired, communicated and processed to provide a control signal to an actuator pose strict demands regarding bandwidth, data delivery time, redundancy, and integrity. Failure to meet one or several of these demands can in applications including "brake-by-wire" or "steer-by-wire" prove dangerous.

One such area wherein reliable high-speed real-time execution and communication of data is applicable is within avionics systems. Advances in technology during late 1960 and early 1970 made it necessary to share information between different avionics subsystems in order to reduce the number of Line Replaceable Units (LRU's). A single sensor such as a position sensor provided information to weapon systems, display system, autopilot and navigation system.

The high level architecture of avionics systems has gone from federated meaning separate LRU's for separate functions to Integrated Modular Avionics (IMA) meaning several functions integrated into multifunctional LRU's. The connectivity allowing communication between different LRU's has gone from low bandwidth point-to-point connections to higher bandwidth point-to-multipoint connections, such as for example switched Ethernet networks.

Guidance set out by Radio Technical Commission for Aeronautics (RTCA) in DO-178B and RTCA DO-254 regulates how to design and develop software and respective hardware in a safe way in order to show airworthiness, according to a criticality scale. However certification and subsequent rectification of software according to the DO-178B represents a substantial cost of developing software based avionic control systems.

In order to assist development of modern control systems for avionics a set of guidance documents such as RTCA DO-297 and Aeronautical Radio Inc. (ARINC) 651 defines general concepts for IMA systems. Further ARINC 653 "Avionics application software standard interface", defines an Application Program Interface (API) referred to as Application Executive (APEX), implemented in Real-Time Operating Systems (RTOS) used for avionic control systems. ARINC 653 allows for space and time partitioning that may be used wherever multiple applications need to share a single processor and memory resource, in order to guarantee that one application cannot bring down another in the event of application failure.

Configuration of one or more ARINC 653 based RTOS for an avionics control system is typically performed by manually entering a large number of configuration data and parameters. The configuration of an IMA system and the associated applications may require a specification that is several thousand lines long. The configuration data and parameters dictate for example conditions for the space and time partitioning and data communication ports. Using DO-297 notation, a number of different engineering teams such as hardware platform providers, software application developers and system integrators usually partake in the process of designing and configuring an avionics control system. It is a complex task to ensure a correct configuration is due to dependencies between multiple configuration data, associated to hardware and software. This is especially the case in an avionics control system comprising a large number software and hardware components. Modifications of the avionics control system performed by one of the engineering team can affect the work already performed by the other teams. Verification and validation of configuration data is typically performed by an iterative procedure comprising providing the configuration data to the avionics control system and subjecting the avionics control system to extensive test procedures to ensure proper function. The outcome of the test procedure may result in an accurate set of configuration data or in a new set of configuration data to be provided to the avionics control system for testing.

U.S. Pat. No. 7,343,622 B1 discloses multi-level secure multi-processor computer architecture. The inventive architecture provides an inexpensive security solution for integrated avionics and includes a plurality of nodes. The nodes are connected via a switch in a network configuration over which data is routed using labels. The switch is controlled to facilitate secure communication of data between the nodes. Each node has a central processing unit. The system manager is implemented as a node and sets up routing tables for selective connection of the nodes via the switch.

US 2009/0005916 A1 discloses a method and system for facilitating substantially seamless interface between individual component systems for sensor fusion, data exchange, and communication across a broad spectrum of component systems in a vehicle without implicating hardware or software upgrade within individual legacy systems and/or sensors. A universal translator is provided to interface between individual system components that exchange data in a seamless manner between legacy data formats and specific data formats advantageously employed by newly-developed, procured and installed individual component systems.

However, moving from centralized avionics control system in attempts to reduce costs and increase modularity tends to decrease determinism and increase complexity related to system configuration.

Accordingly, there is a need in the art of avionics to present improved methods, intended to facilitate system configuration and enhance adaptability and determinism.

BRIEF SUMMARY

It is therefore an objective of the present invention to provide a method and a computer program performing said method, that facilitates configuration and achieve increased adaptability and determinism in regard of the data traffic and processing within a distributed avionics system.

This objective is achieved according to the present invention by a method for configuring synchronous table-driven operations of a distributed avionics control system comprising a plurality of processing nodes interconnected in a network, wherein the plurality of processing nodes are arranged to execute a plurality of applications. The method comprises the steps of providing a global timing meta-data component, said global timing meta-data component comprising information of a set of predetermined periodically repeating processing periods, and a plurality of communication time-slots; providing a plurality of application meta-data components, said plurality of application meta-data components comprising information associating to each of the plurality of applications at least one processing subcomponent, wherein the at least one processing subcomponent is associated to at least one unit of data to be periodically imported into the at least one processing subcomponent or exported from the at least one processing subcomponent and a processing period from the set of predetermined repeating processing periods; providing a node assignment meta-data component, said node assignment meta-data component comprising information identifying assignment of each of the plurality of applications to the plurality of processing nodes; detecting data communication paths, based on information from the node assignment meta-data component and the plurality of application meta-data components, detecting communication requirements, associated to delay constraints along the detected communication paths, based on information from the plurality of application meta-data components, generating a system schedule meta-data component, by allocating to the plurality of communication time-slots, communication of at least one data message, comprising the at least one unit of data to be periodically exported by the at least one processing subcomponent associated to each of the plurality of applications, based on information from the detected communication requirements, generating system configuration data based on information from the system schedule meta-data component, said generation comprising providing system tables associated to each of the plurality of system nodes, each system table comprising a network communication schedule and providing the system configuration to the distributed avionics control system.

It is achieved that the application developer, platform provider and system integrator can perform work independently from each other since the actual configuration is abstracted into the various meta-data components and thereby also that the applications are decoupled from each other and deployment onto the target system i.e. deployment onto the distributed avionics control system. Modifications of the system can be performed without modifying the behavior of the applications or source code associated to the applications.

It is further achieved that configuration of interactions between applications distributed over the target system can be facilitated since communication configuration data compliant to communication requirements is generated automatically based on the meta-data components. The need for testing and validating configuration data is thus reduced since the configuration ensure periodic deterministic connectivity between applications prior to system run time based on configuration providing periodic execution of the applications.

The method is in one option further characterized in that the step of detecting data communication paths comprises processing the node assignment meta-data component and the plurality of application meta-data components so as to detect a plurality communication paths formed between at least a first processing subcomponent, associated to at least a first unit of data, to be periodically exported and at least a second processing subcomponent associated to a different application than said first processing subcomponent, wherein said at least first unit of data is intended to be periodically imported into said at least second processing subcomponent.

The method is in one option further characterized in that the step of detecting communication requirements comprises processing information related to the processing period associated to the processing subcomponents, forming data communication paths, so as to detect a periodic communication window for of the at least one data message comprising the at least one unit of data to be periodically exported along each of the plurality of detected communication paths.

The method is in one option further characterized in that the step of providing a plurality of application meta-data components further comprises providing information on worst case processing time associated to each of the at least one processing subcomponent and wherein the step of providing a node assignment meta-data component further comprises the steps of providing information identifying at least one partition assigned to each of the plurality of processing nodes and assignment of each of the plurality of applications to one of the at least one partition.

The method is in one option further characterized in that the predetermined periodically repeating processing periods comprise a fundamental periodically repeating processing period and integer multiples of the of the fundamental periodically repeating processing period.

The method is in one option further characterized in the further step of detecting a partition processing time-frame for each of the at least one partition associated to each of the plurality of processing nodes, based on processing the worst case processing time of the processing subcomponents, associated via the application meta-data component to the at least one partition, wherein the partition processing time-frame statically define a start and stop time within each fundamental periodically repeating processing period and wherein the processing subcomponents are arranged to be processed in a rate monotonic order within the associated partition.

The method is in one option further characterized in that the step of generating a system schedule meta-data component comprises processing the periodic communication window along each of the plurality of detected communication paths, so as to statically allocate the at least one data message to at least one of the plurality of communication time-slots, over a repeating major processing period defined by the least common multiple of the set of predetermined periodically repeating processing periods, based on the stop time of the partition and the processing period of the at least first processing subcomponent having associated the at least first unit of data to be periodically exported and either the start time of the partition of the at least second processing subcomponent having associated said at least first unit data to be imported or the start time of the partition in a subsequent fundamental periodically repeating processing period of the at least first processing subcomponent.

The method is in one option further characterized in the further step of providing a system hardware topology meta-data component, comprising information identifying the processing nodes and network connections between said processing nodes and wherein the step of detecting data communication paths further comprises processing the system hardware topology meta data component so as to generate routing data for each detected communication path.

The method is in one option further characterized in the further step of providing at least one data message meta-data component, said at least one data message meta-data component each comprising information identifying the at least one data message and an associated number of data message subcomponents, each associated via the plurality of application meta-data components to one of the at least one unit of data to be periodically exported or imported, associated to the at least one processing subcomponent; and wherein the at least one data message meta-data component further comprises information identifying a data type associated to each of the number of data message subcomponents.

The method is in one option further characterized in the further step of detecting a data message bit size for each of the at least one data message, based on processing the at least one data message meta-data component; and wherein the step of generating a system schedule meta-data component, further is based on the detected data message bit size for each of the at least one data message.

The method is in one option further characterized in the further step of detecting format conversion data, based on processing the at least one data message meta-data component and the detected data bit size for each of the at least one data message and wherein the step of generating a system configuration, further is based on the detected format conversion data so as to provide format conversion instructions related to packing and/or un-packing of the at least one data message.

The method is in one option further characterized in the further step of adding an overhead bit size to the detected bit size of each of the data messages before performing the step of generating a system schedule meta-data component and wherein modifying a parameter of one of the plurality of application meta-data components after having performed the step of generating a system schedule meta-data component cause an additional unit of data to be imported by the at least one associated processing subcomponent without performing a renewed step of generating a system schedule meta-data component.

This objective is also achieved by a computer programme comprising a programme code for performing the above described method steps, when said computer programme is run on a computer.

This objective is also achieved by a computer programme product comprising a program code stored on a computer readable media for performing the above described method steps, when said computer programme is run on the computer.

This objective is also achieved by a computer programme product directly storable in an internal memory of a computer, comprising a computer programme for performing the above described method steps, when said computer programme is run on the computer.

BRIEF DESCRIPTION OF THE FIGURES

FIG. 8. shows a schematic illustration of a set of operational tools for providing and processing configuration files in accordance with an example of the invention.

FIG. 9. shows a schematic illustration of a communication time window in accordance with an example of the invention.

FIG. 10, shows a schematic illustration of a flow diagram for a method to generate configuration data in accordance with an example of the invention.

DETAILED DESCRIPTION OF VARIOUS EMBODIMENTS

The following examples relates to the case where the distributed control system is described with reference to aerial vehicles. However, various different applications are possible, e.g. for use in land, sea or space vehicles.

Figure 1:
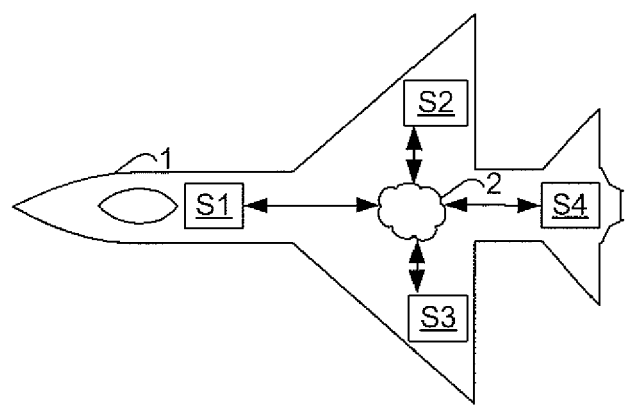
FIG. 1. shows schematically a distributed avionics system in accordance with an example of the invention.

Referring to the drawings, and initially to FIG. 1, there is illustrated a distributed avionics computer system to be configured according to an example of the present invention. The distributed avionics computer system may comprise a plurality of interconnected avionics computers S1-S4 arranged to be mounted in various locations of an aerial vehicle 1 and act as controller of at least one or a set of subsystems of the aerial vehicle 1, such as act as a controller of a fuel injection system or hydraulics of an aileron.

Figure 2:
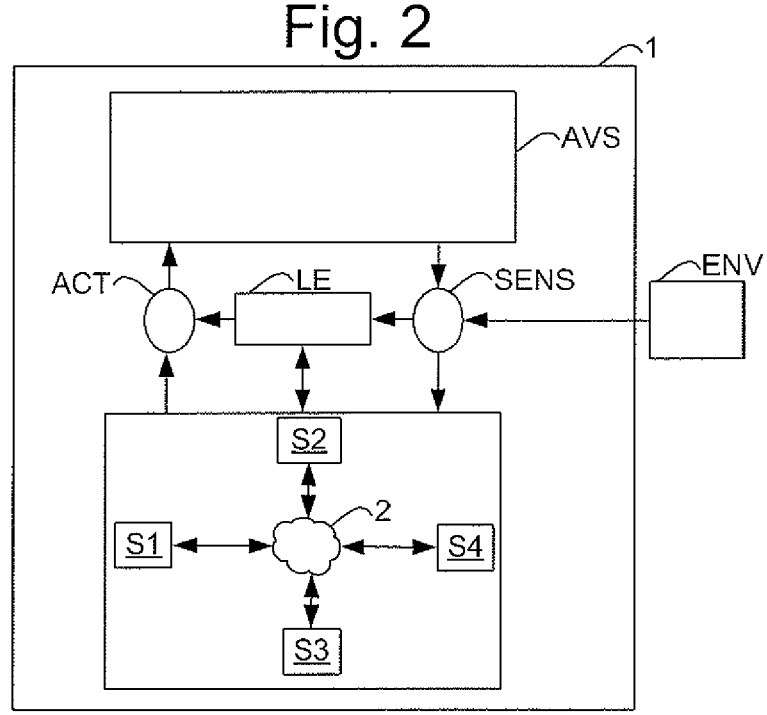
FIG. 2. shows schematically the distributed avionics system integrated to components of an aerial vehicle in accordance with an example of the invention.

In FIG. 2 there is illustrated an alternative view of the distributed avionics computer system to be configured, viewed as integrated systems/components of the aerial vehicle 1. The set of avionics subsystems AVS may comprise systems such as for example ailerons, flaps fuel injection and payload. The distributed avionics computer system may comprise at least one computer node S1-S4, such as a general purpose computer arranged as a flight control computer (FCC) and/or a mission control computer (MCC), arranged to be in communicative connection with various avionics subsystems AVS and additional systems and/or components such as sensors SENS, actuators ACT and one or more control stations. The sensors SENS may provide information related to properties of the various avionics subsystems AVS and of an operating environment ENV surrounding the aerial vehicle 1. The one or more control stations may provide information related to interactions from one or more operators of the aerial vehicle 1. The distributed avionics computing system may be arranged to process the information provided from one or more of the sensors SENS and/or control stations, in order to provide control data to the one or more actuators ACT and/or presentation data to the control stations. The distributed avionics computer system may be coupled to at least one legacy avionics processing component LE, such as for example a legacy LRU arranged as a radar processing unit, arranged to be in communicative connection with the various avionics subsystems AVS and additional systems and/or components such as sensors SENS, actuators ACT and the one or more control stations.

Figure 3:
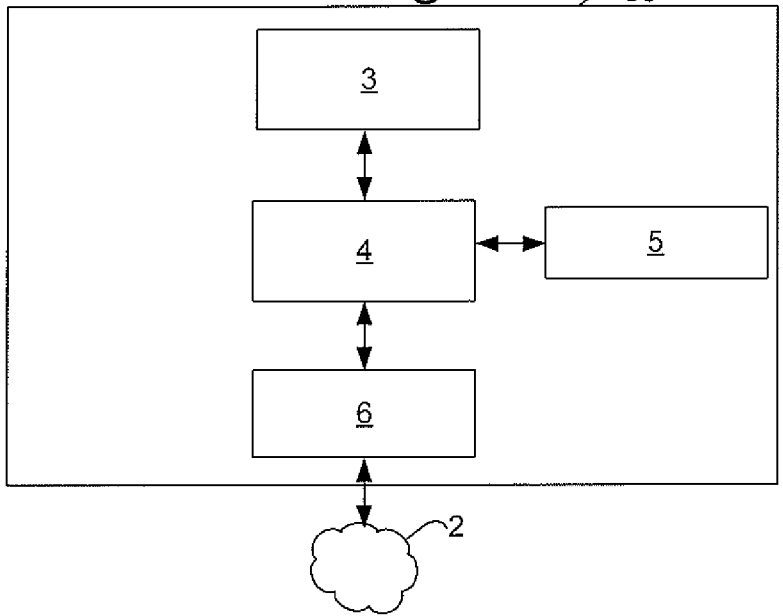
FIG. 3. shows a schematic block diagram of hardware components of the distributed avionics system in accordance with an example of the invention.

With reference to FIG. 3 the hardware configuration 35 of one of the plurality of computers S1 to be configured is illustrated in accordance with an example of the invention. Each of the plurality of computers S1-S4, hereinafter referred to as nodes S1-S4, may comprise at least a processor 4, memory 3, hardware clock (not shown), power supply (not shown), bus interface 6 and I/O interface 5. The I/O interface 5 may be arranged to provide access to system peripherals e.g. devices coupled to the respective node by means of VME, PCIe or the like. The distributed system may further comprise at least one network 2, such as for example a switched Ethernet network, operatively connecting the nodes S1-S4, thereby enabling exchange of data messages between the nodes. Access to the network may be provided by the respective bus interface 6 which may be arranged to place data messages to and/or retrieve data messages from the network 2 in accordance with predetermined instructions. The bus interface 6 may further be arranged to provide access by means of one or more additional connections to other devices such as remote data concentrators (RDC's), sensors and/or actuators. The one or more connections to the other devices may be point-to-point connections such as RS-422 or of bus type such as MIL-STD-1553, IEEE 1394, or other similar type of connection known within the art.

Figure 4:
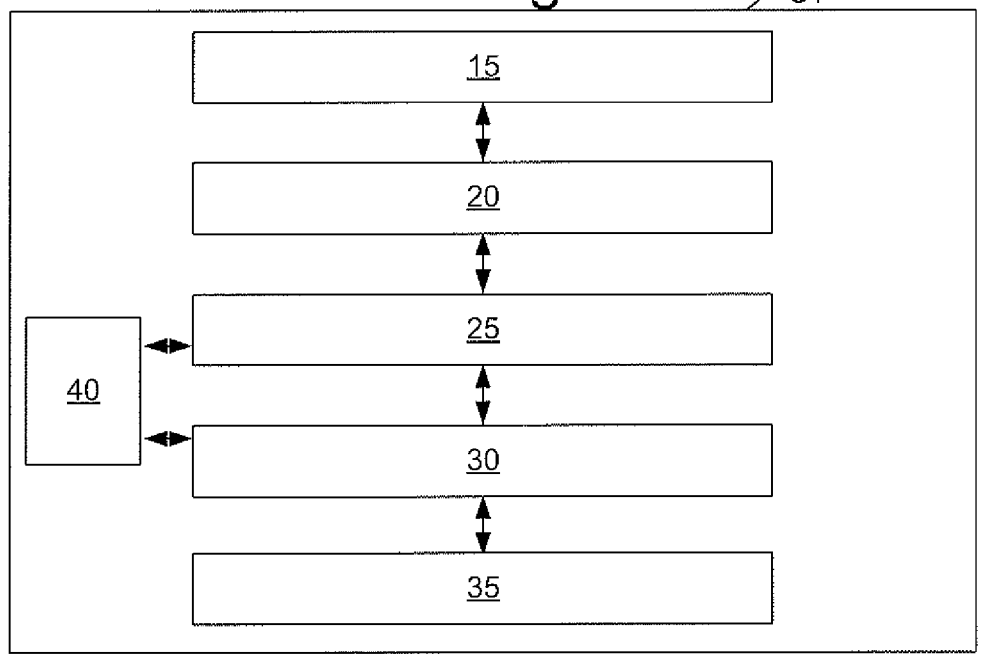
FIG. 4. illustrates a schematic representation of the hardware components and software in accordance with an example of the invention.

In FIG. 4 the configuration relating to the high level architecture of one of each of the plurality of computers S1 to be configured is illustrated in accordance with an example of the invention. Each node S1-S4 may apart from the above described hardware 35 with reference to FIG. 2 comprise a hardware interface system 30, arranged to by means of a set of interface drivers to provide access to specific hardware such as the memory 3 and the hardware clock. Each node S1-S4 may further comprise an operating system 25 such as a real-time operating system RTOS. The operating system may be arranged to provide a number of services to a set of applications. The number of services may relate to communication, scheduling, memory management, timing and health monitoring, such as providing local system time and timer services. In providing the services the operating system may be arranged to interact with the hardware 35 by means of the hardware interface system 30. Each node S1-S4 may further comprise a configuration data module (CDM) 40. The configuration data module 40 may be arranged in operative connection with the operating system 25 and the hardware interface system 30 to provide information stored within the configuration data module relating to specific configuration of memory access, scheduling and communication. As an example the configuration data module may be arranged to provide the RTOS with initialization parameters associated to execution, timing and memory configuration.

Each application of the set of applications to be configured and deployed into the distributed avionics computer system may comprise one or more tasks, also referred to as processes. Each of the one or more tasks may denote a logical unit of computation with a single thread of control. As an example an application may be arranged to process sensor readings and control commands provided by an operator by means of one or more control laws, to continuously provide a control signal to an actuator, such as to an actuator associated to an aileron. As an example one of the tasks may be configured to perform a derivative operation on a first data variable retrieved from a sensor at time t. As a further example one of the tasks may be configured to perform a computation at time t and t+1 to provide a second data variable relating to a velocity of an object at time t and t+1 given a first data variable associated to the acceleration of the object at time t and t+1.

Figure 5:
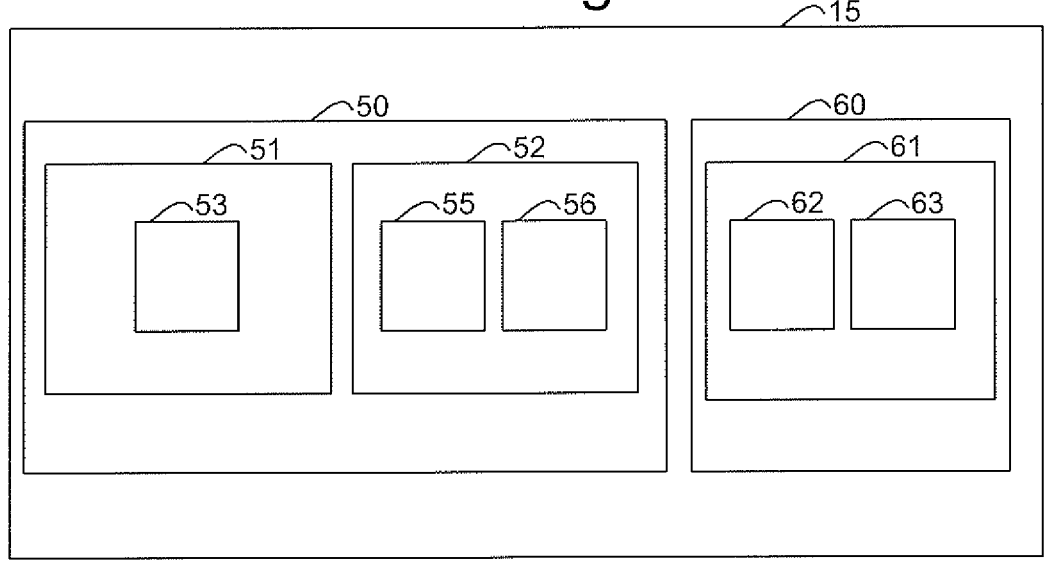
FIG. 5. illustrates a schematic representation of a portion of the software architecture in more detail.

In one example each node S1-S4 may be arranged to execute a partitioned real-time operative system RTOS, compliant with ARINC 653, to allow for spatial and temporal partitioning of the set of applications comprised in an integrated modular avionics IMA partitioning module 15. With reference to FIG. 5 the IMA partitioning module 15 may comprise one or more partitioned applications such as for example a first application 51, a second application 52 and a third application 61. Each of the applications may be divided in the IMA module 15 into one or more partitions such as for example a first partition 50 associated to the first application 51 and the second application 52 and a second partition 61 associated to the third application 61. Each of the applications 51-52 and 61 may further comprise one or more tasks. As an example a first task 53 may be associated to the first application 51, a second task 55 and a third task 56 may be associated to the second application 52 and a fourth task 62 and fifth task 63 may be associated to the third application 61. The one or more node S1-S4 may further each comprise an abstraction layer provided by an application programming interface (API) 20 located between application software in the IMA partitioning module and operative system OS. The API 20 may be arranged to provide a set of basic services to the set of applications required for performing their respective tasks and in order to communicate.

In one the example the API may be arranged as an application executive APEX, conforming to the ARINC 653 specifications. The implementation of the ARINC 653 specifications, for high level IMA architecture prevents error propagation when running different applications on a single processor. The partitioning enables to run applications certified to different criticality level measured by Design Assurance Level (DAL) according to the RTCA DO-178B on a single processor.

Figure 6:
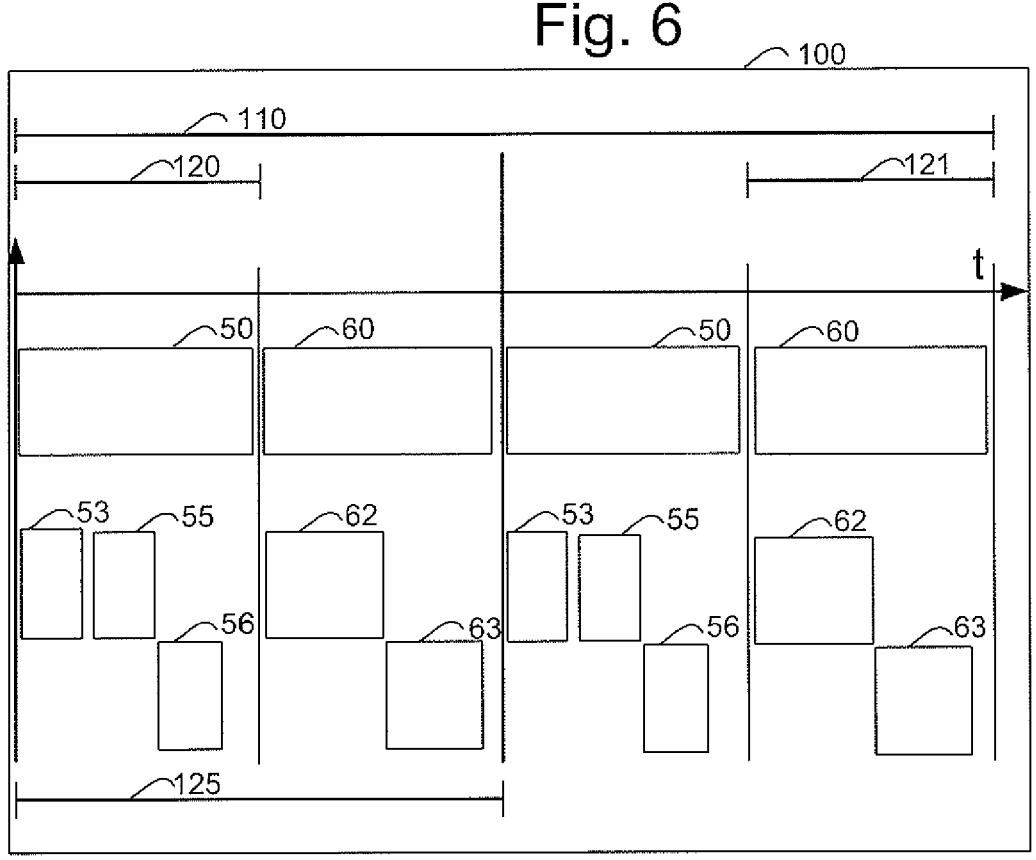
FIG. 6. shows a schematic illustration of an execution schedule in accordance with an example of the invention.

In FIG. 6 an execution schedule 100 of partitions associated to one of the nodes is illustrated in accordance with an example of the invention. The processing resources of the processor 4 in each of the nodes S1-S4 may be divided by means of configuration into a set of minor execution time frames 125 also referred to as minor processing time frames. Each of the minor execution time frames 125 may be arranged to be periodical i.e. reoccurring periodically at time instants defined by a period time. Each of the one or more partition allocated to the IMA partitioning module 15 in each of the respective nodes may be provided with at least one execution time frame, such as for example a first execution time frame 120 associated to the first partition 50, providing the partition with exclusive access to the processing resources 4 of the respective allocated node S1 for the given at least one execution time frame 120. One or several minor execution time frames may comprise one or more execution time frames associated to the partitions, such as for example a first execution time frame 120 associated to the first partition 50 and a second execution time frame 121 associated to the second partition 60. A major execution time frame 110 may determine the intrinsic repeat cycle of the schedule defined by one or several minor execution time frames 125 in each of the nodes S1-S4.

In one example each of the partitions associated to the respective node may be assigned a time frame each of a partitioning schedule, determining the order and execution time frame for processing the partitions within each minor processing frame 125.

The execution schedule 100 may be utilized by the operating system 25 to determine when to perform context switches between different partitions and the tasks associated to the different partitions by means of clock interrupts provided from the hardware 35. For example the execution schedule 100 may determine when to perform context switches between the first partition 50 and second partition 60 and the respective associated tasks 53, 55-56, 62-63.

It should be understood that the configuration regarding the number of applications, tasks, and partitions thereby also the execution frames may differ from the illustrated example with reference to FIG. 6.

Determination of the execution schedule 100 for each of the nodes S1-S4 may be performed by means of considering the computational requirements of the applications and their associated one or more tasks in respect of the resources provided by the nodes S1-S4.

During the execution time frame for the specific partition of the one or more partitions, the tasks associated to the specific partition may be executed on a priority basis. Each task may be assigned a task frequency or period, relating to the subsequent executions also referred to as invocations of the task.

In one example each of the tasks of the distributed avionics computing system may be arranged to execute periodically. In order to execute periodically the release time, referring to when a task may start to execute, may be time-triggered at a regular i.e. at a cyclic basis, such as time triggered by means of the timer services provided by the operating system. Each task may then be defined by a set of properties associated to timing, including a period time T defining the time interval between successive releases of the task, a completion time (CT) defining the time when the task completes its execution, a deadline (D) defining the latest time when the task should complete its execution and a worst case execution time (WCET) defining the time needed to execute the task without interruption. To determine the WCET for each specific task a series of measurements or static timing analysis may be performed. By assigning each task with design parameters relating to the deadline D and period T of the task, conformant to the conditions below, a feasible periodic task schedule may be achieved.

$$CT \leq WCET < D < T$$

$$U = \sum_{i=1}^{n} \frac{WCET_i}{T_i} \leq 1$$

U denotes the processor utilization parameter of the processor assigned to execute set of task as indicated by index i, and n denotes the total number of tasks assigned to the processor resource. As an example a computed value regarding U that is equal to 1, corresponds to 100 percents processor utilization.

In one example the execution order of the one or more tasks during the execution time frame allocated to the partition may be scheduled by a priority-based pre-emptive scheduler such as scheduled in order of decreasing process frequency i.e. the tasks in each partition are executed on a rate-monotonic (RM) priority basis.

In one example the execution order of one or more tasks during the execution time frame allocated to the partition may be scheduled on a deadline-monotonic (DM) basis i.e. tasks are scheduled in order of increasing deadline for task completion.

The priority-based pre-emptive scheduler may be arranged to interrupt task execution, when some higher-priority task needs to be executed and resume it at a later instant of time. In a case wherein several tasks being assigned to the same partition are assigned with the same update frequency, first-in-first-out (FIFO) order may be used to determine internal order of execution. Hence, the execution of applications on each local node may be arranged to be controlled by a two level scheduler. The first level scheduler is arranged to schedule preemption of the local partitions determined from the predetermined execution time frames for each of the partitions residing in the IMA partitioning module 15 of the respective local node S1-S4. To determine the order of execution of the partitions, static predetermined priorities may be assigned to the partitions prior to system run-time. The second level scheduler is arranged to schedule the one or more tasks within each of the partitions on a priority pre-emptive basis during the predetermined execution time frame for the partition.

As an example with further reference the first partition 50 may be allocated to a first node S1 and assigned with the first execution time frame 120 of for example 10 ms and with a period of 25 ins corresponding to a repeat i.e. update frequency of 40 Hz. The first task 53, second task 55 and third task 56 may be associated to the first partition 50. The first and second task may be assigned with a task frequency of 40 Hz and the third task may be assigned with a task frequency of 20 Hz. The second partition 60 may be allocated to the node S1 and assigned with the second execution time frame 121 of for example 12 ms and with a period of 25 ins corresponding to a repeat i.e. update frequency of 40 Hz. The fourth task 62 and fifth task 63 associated to the second partition 60 may be assigned with a task frequency of 40 Hz and 20 Hz respectively. Hence, the instances of the first task 53 and the second task 55 are executed once each 25 ms time period, the instances of the third task 56 are executed once each 50 ins time period. The instances of the fourth task 62 are executed once each 25 ms time period and the instances of the fifth task 63 are executed once each 50 ins time period. The major time period 110 for the schedule may then be determined to be the least common multiple of the execution time period of each of the tasks associated to each of the nodes S1-S4, such as for example the least common multiple of 25 ins and 50 ms corresponding to 50 ms, which is the time period where after the sequence of execution of task instances i.e. schedule may repeat cyclically. It is to be noted that one or more task instances, such as the instance of the third task 56 and fifth task 63 may be pre-empted during a first execution of its associated partitions 50, 60 and later be resumed during a subsequent execution of its associated partition 50, 60. The third task 56 may for example be pre-empted depending on if the CT of the third task 56 together with the CT of one or more other tasks residing in the same partition such as for example the CT of the first task 53 and second task 55 exceeds the time period assigned to the respective partition 50.

In one example the task processing frequency may be configured to be selected from a harmonic set of frequencies with corresponding periods such as for example the set of frequencies comprising 40 Hz, 20 Hz, 10 Hz and 5 Hz. The task processing frequency may be selected on basis of the respective task requirements for frequent execution time.

In one example the set of task processing frequencies is provided as a set of system global processing frequencies. Hence, all tasks distributed across the distributed system of interconnected nodes S1-S4 may be assigned with a task processing frequency each, selected from the set of predetermined global task processing frequencies. Thus, all tasks distributed onto the one or more nodes S1-S4 are assigned with one processing frequency and/or processing period time each, determined from the set of global processing period frequencies.

In one example the task processing frequency of each specific task may be selected on basis of how often input data are updated or how often subsequent input data significantly changes in its parameter value.

In one example the task processing frequency of each specific task may be selected on basis of how often output data from the process is required by other parts of the system.

In one example the task processing frequency of each specific task may be selected on basis of a combination of how often input data are updated or how often subsequent input data significantly changes in its parameter value and/or how often output data from the process is required by other parts of the system In one example information to be provided to the configuration data module 40 associated to each of the nodes S1-S4 may be constructed and/or managed using a set of configuration files. The set of configuration files may provide various elements of the distributed avionics computer system with configuration information relating to scheduling, memory access and communication. The set of configuration files may for example provide the information to the operating system OS and/or hardware interfaces and/or other components of the respective system nodes S1-S4. Construction of the set of configuration files may be performed in several ways using different forms. The configuration files may for example be in the form of some programming language data declarations, in general markup language form such as for example in eXtensible Markup Language (XML), or in some text-based proprietary format.

In one example the set of configuration files may be constructed using model based development tools.

In one example a first subset of the set of configuration files may be automatically generated based on a second subset of the set of configuration files.

The configuration data from the configuration files associated to partitioning of the set of applications and other OS related attributes can later be linked to and compiled with source code associated to for example the set of applications to provide executable files in machine readable format.

In one example the configuration files may be compiled into binary format using a RTCA DO-178B certified compiler.

In one example a subset of the set of configuration files may be associated to an ARINC 653 implementation associated to each of the nodes S1-S4. The subset of configuration files, may describe the characteristics of partitions, their interactions, and their time and resource requirements. After the subset of configuration files is loaded and processed, the ARINC 653 based RTOS associated to each of the nodes S1-S4 may provide the behavioral ARINC 653 support by allocating memory for the system partitions, setting up memory protection structures, and allocating other system resources.

Figure 7:
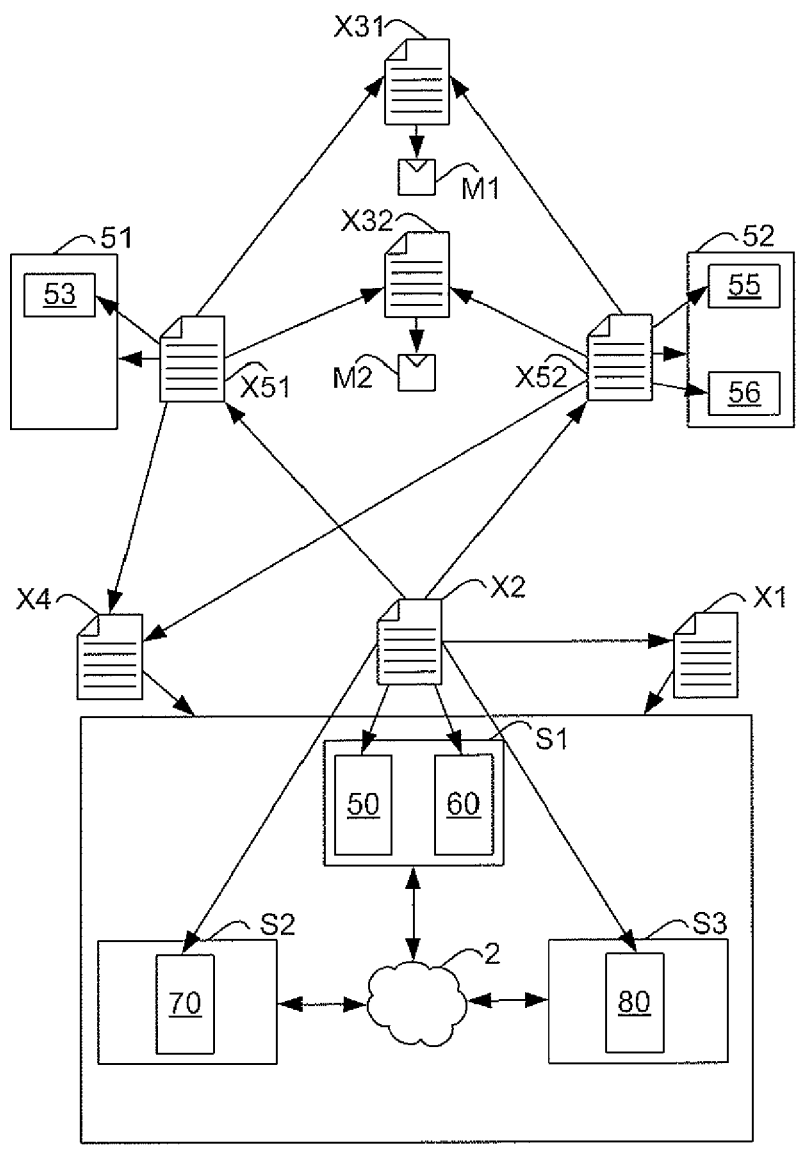
FIG. 7. shows a schematic illustration of relations between configuration files associated to hardware and software in accordance with an example of the invention.

In one example of the present invention with reference to FIG. 7 the configuration data may be constructed using a set configuration files comprising a number of subsets of configuration files. Each of the subset of configuration files may comprise one or more configuration file associated to one of a group comprising system hardware topology, software topology, data messages, system timing, and applications.

The one or more configuration file X51-X52 associated to applications can each be provided with information identifying each of the set of applications and the one or more task associated to the respective application. The one or more configuration files X51-X52 associated to applications may be provided with information identifying the processing frequency or processing period associated to each of the one or more tasks. The one or more configuration file X51-X52 associated to application configuration can be provided with information associating a number of data messages M1-M2 to each of the applications or each associated one or more task. The one or more configuration file X51-X52 associated to application configuration can be provided with information associating one or more data message that the application or associated one or more task is configured to import or export. The one or more configuration files X51-X52 associated to applications may be provided with information denoting which one or more data variable that is to be extracted into the application or task from the one or more data message configured to be imported by each application or task and which one or more data variable that is to be inserted into the one or more data message configured to be exported from each application or task.

In one example the one or more configuration file X51-X52 associated to applications can each be provided with information identifying a WCET associated to each of the tasks.

The one or more configuration file X31-X32 associated to data messages can each be provided with information related to identifying the one or more data variables each data message comprises.

In one example the one or more configuration files X31-X32 associated to data messages may be provided with information related to a data type associated to each of the specific data variables. The data type associated to each of the specific data variables may for example be Signed Integer or String followed by a data declaration associated to word size. As an example a first data message M1 associated to positioning data may comprise a first data variable associated to current position and a second data variable associated last position.

As an example a first configuration file X51 associated to application configuration of the first application 51, identify the first application 51, the first task 53 associated to the first application 51 and the first data message M1 identified via a first configuration file X31 associated to data messages that the first application 51 is configured to import or export and a second data message M2 identified via a first configuration file X32 associated to data messages that the first application 51 is configured to import or export. A second configuration file X52 associated to application configuration of a second application 52 identify the second application 52, the second task 55 and third task 56 associated to the second application 52 and the first data message M1 identified via a first configuration file X31 associated to data messages that the second application 52 is configured to import or export and the second data message M2 identified via a first configuration file X32 associated to data messages that the second application 52 is configured to import or export.

The one or more configuration file X1 associated to hardware topology can be provided with information related to identification and resource information of specific hardware associated to the distributed avionics computer system. The one or more configuration file X1 associated to hardware topology may for example provide information associated to processors, data switches, data concentrators and the available physical connections such as for example PCI, PCIe, VME, IDE, Ethernet, IEEE 1394 or MIL-STD-1553 connecting each of the specific system hardware to other specific hardware comprised in the distributed avionics computer system. As an example a first configuration file X1 associated to hardware topology can be provided with information identifying a first node S1, a second node S2 and third node S3 interconnected in a network 2.

The one or more configuration file X4 associated to system timing can be provided with information related to task processing frequencies associated to the tasks of each application of the set of applications and the protocol associated to the at least one network 2. The protocol associated to the at least one network 2 may in one example be a periodically repeating Time Divisional Multiple Access (TDMA) type protocol for a switched Ethernet based network, specifying a number of communication time-slots with associated properties relating to for example duration of each time-slot, configuration of synchronization time-slots and dead band also referred to as communication inter-frame gap time-slots.

In one example the one or more configuration file X4 associated to system timing may be provided with information associated to a global fundamental processing frequency or period also referred to as the minor processing frame 125.

In one example the one or more configuration file X4 associated to system timing may be provided with information related to the global task processing frequencies or periods forming a set of harmonic frequencies or periods. As a result each of the global processing frequencies form positive integer multiples of the minor processing frame 125.

In one example the one or more configuration file X4 associated to system timing may be provided with information on a minor communication bus period comprising a predetermined number of the plurality of communication time-slots each of a predetermined duration. The duration of the minor communication bus period is equal to the minor processing time frame 125 i.e. the total duration of the predetermined number of communication time-slots in the minor bus period correspond to the duration of the minor processing frame 125.

The one or more configuration file X2 associated to software topology can be provided with information related to identifying deployment of each of the set of applications i.e. identifying a number of partitions associated to each of the nodes S1-S4 and identifying the partition of the number of partitions in which each application of the set of applications is to be hosted. As an example a first configuration file X2 associated to software topology may identify that a first node S1 defined in the one or more configuration file X1 associated to hardware topology comprise a first partition 50 and second partition 60, a second node S2 comprise a third partition 70 and a third node S3 comprise a fourth partition 80. The first configuration file X2 associated to software topology may further identify that the first application 51 defined in the one or more configuration file X51 associated to hardware topology is to be hosted in the first partition 50 and that the second application 52 defined in the one or more configuration file X52 associated to hardware topology is to be hosted in the third partition 70.

In one example the one or more configuration file X2 associated to software topology can be provided with information associated to internal scheduling of partition context. The information associated to internal scheduling of partition context may define rate-monotonic scheduling of the tasks associated to each partition.

In one example the one or more configuration file X2 associated to software topology can be provided with information associated to a static local processing order of the partitions associated to each of the nodes S1-S4. The local processing order of the partitions associated to each of the nodes S1-S4 may determine the order in which to process each of the partitions in each of the nodes S1-S4 within one or more repeating minor processing frame 125.

In one example with reference to FIG. 8 each of the configuration files X1-X2, X31-X32, X4 and X51-X52 may be used as input data to a set of operational tools. The set of operational tools may be arranged to process information extracted from one or more of each of the configuration files X1-X2, X31-X32, X4 and X51-X52 so as to automatically provide additional configuration data related to for example connectivity between the set of applications.

The operational tools may in one example be implemented as software operating in a computer environment separated from the distributed avionics computer system.

The set of operational tools may in one example comprise a configuration file module 210 arranged to provide the configuration files X1-X2, X31-X32, X4 and X51-X52. The configuration module 210 may be coupled to a display unit 215 to enable a visual representation such as for example a tree-structure or a model schema representative of the configuration of the distributed avionics computer system, based on the provided configuration files X1-X2, X31-X32, X4 and X51-X52. The set of operational tools may comprise a configuration data input module 220 coupled to the configuration file module 210 to enable import and/or export operations associated to configuration files. The set of operational tools may comprise a user input module 225 coupled to the configuration file module 210, such as for example a keyboard and/or mouse to provide means to manipulate the configuration files for a user, for instance being assigned the role of system integrator.

The configuration file module 210 may be arranged to transfer configuration files to a number of additional modules associated to the set of operational tools. The configuration files may be transferred automatically or by command from the user.

The number of additional modules may comprise a message module 235 arranged to process the one or more configuration files X31-X32 associated to data messages transferred from the configuration file module 210 to provide and/or record a number of data bit sizes, representative of a data bit size of each of the data messages M1-M2. The message module 235 may for example process the one or more configuration files X31-X32 associated to data messages based on summing the data variables with the associated data types in order to provide the data bit size of each of the data messages.

In one example the message module 235 may be arranged to add an overhead data bit size to at least one of the provided data bit sizes associated to each of the data messages. The overhead parameter may be a predetermined data bit size.

In one example the number of additional modules may comprise a path detection module 231 arranged to detect communication paths between each of the tasks arranged to exchange data messages using the at least one network 2. The path detection module 231 may be arranged to detect the communication paths based on identifying remote connections i.e. connections between tasks associated to applications allocated to different nodes S1-S4, wherein the tasks are arranged to exchange data messages.

In one example the path detection module 231 may process the one or more configuration file X2 associated to software topology in order to provide hosting information identifying the node S1-S4 on which each of the applications with associated tasks are arranged to be hosted. The remote connections may be detected by processing the hosting information and information extracted from the one or more configuration file X51-X52 associated to applications relating to which data message each application and/or task is configured to import or export. As an example the path detection module 231 may detect a first communication path between at least a first application of the set of applications with at least one associated task arranged to import at least one data variable arranged to be exported from at least one of the tasks associated with at least a second application hosted on a different node S1-S4 than said first application.

In one example the path detection module 231 may be arranged to detect the communication paths between the tasks arranged to exchange data using the at least one network 2 and store information related to each detected communication path. The information related to each detected communication path may comprise the processing period or frequency associated to the tasks defining the communication path and a source i.e. the task arranged to export the at least one data variable and one or more destinations i.e. information identifying the at least one task arranged to import the at least one data variable and one or more location representative of which of the nodes the associated at least one application is arranged to be hosted on.

In one example the information related to the detected communication paths may comprise information identifying a physical route for each communication path. The physical route may for example comprise one or more switch and data link associated to the at least one network 2, identified via media access control (MAC) addresses associated to each node S1-S4 and/or additional elements coupled to the at least one network 2.

In one example the information related to the detected communication paths may comprise information identifying the partitions associated to the applications with associated tasks that are arranged to exchange data messages over the network 2 and/or ARINC 653 ports such as sampling and/or queuing ports associated to each of the partitions.

In one example with reference to FIG. 9 the number of additional modules may comprise a communication requirement detection module 232 arranged to process the information provided from the path detection module 231 associated to the processing period or processing frequency associated to the tasks involved in exchanging data variables, so as to detect at least one communication time window CW1-CW2 along each of the detected communication paths. The at least one communication time window comprises information related to at least a first instant of time representative of when at least a first data variable is computed and ready for export as a result of at least a first invocation of the at least first task and at least a second instant of time representative of when the at least first data variable is required to be imported in order to be processed as a result of an invocation associated to at least one task associated to an application hosted on a different node S1-S4.

It is to be noted that several communication windows may be detected along each of the communication paths, based on the processing period of task defining the source, the processing period of the at least one task defining the destination and the major processing period 110.

In one example communication requirement detection module 232 may be arranged to detect the major processing period 110 based on the least common multiple (LCM) of the task processing periods extracted via the one or more configuration file X4 associated to system timing.

In one example the communication requirement detection module 232 may be arranged to detect a number of periodically occurring communication windows for each detected communication path based on the detected major processing period 110 and the processing period associated to the task defining the source of the communication path. For example the communication requirement detection module 232 may detect the number of periodically occurring communication windows for each detected communication path to be equal to the processing period associated to the task defining the source of the communication path divided with the major processing period 110.

In one example the first instant of time and second instant of time may be detected by the communication requirements detection module 232, based on processing information related to the WCET associated to the tasks and information related to the processing order of the partitions. The information related to the WCET associated to the tasks can be extracted from the one or more configuration file X51-X52 associated to applications. The information related to the processing order of the partitions can be extracted from the one or more configuration file X2 associated to software topology.

In one an example the communication requirement detection module 232 may detect the execution time frame for each one of the partitions based computing the sum of the WCET of each of the tasks associated to each of the one or more application that is associated to each one of the partitions. The start point and end point within each minor processing frame 125 for each execution time frame of each of the partitions may then be detected by the communication requirement module 232 based on processing the processing order of the partitions associated to each of the nodes S1-S4 and the detected execution time frame of each of the partitions associated to each of the nodes S1-S4.

The first instant of time also referred to as start point of each of the communication windows may be detected by the communication requirements detection module 232, based on identifying as the start point of the each communication window the end point of the detected execution time frame for the partition associated to the task defining the source of each of the communication paths.

The second instant of time also referred to as end point of each of the communication windows may be detected by the communication requirements detection module 232, based on identifying as the end point of the each communication window the start point of the detected execution time frame for the at least one partition associated to the at least one task defining the destination of each of the communication paths.

In one example the end point of each of the communication windows may be detected by the communication requirements detection module 232, based on identifying as the end point of the communication window the start point of the detected execution time frame in a subsequent minor processing period for the at least one partition associated to the task defining the source of each of the communication paths.

In one example the communication requirement detection module 232 may be arranged to detect the worst case transmission time along each of the detected communication paths, based on processing the bit size of the data message to be transmitted along the respective detected communication path and the network properties extracted from the one or more configuration file X4 associated to system timing. The detected worst case transmission time along each of the communication paths can be utilized by subtracting the detected worst case transmission time from the communication time window so as to provide a communication window, compensated for propagation delay on the at least one network 2.

In one example additional communication requirements can be processed by the communication requirement detection module 232. The additional communication requirements may for example relate to maximum end-to-end communication delay. The maximum end-to-end communication delay may for example relate to a maximum amount of time allowed for a process associated to retrieving a value from a sensor to be imported and subsequently processed by one or more of the tasks for communication to an actuator.

As an example the first node S1 may be arranged to host the first partition 50 with associated first application 51 with the associated first task 53 and the second application 52 with the associated third task 56. The second node S2 may be arranged to host the second partition 60 with associated third application 61 with the associated fourth task 62. The first task 53 and fourth task 62 may be associated to a processing period of 25 ms corresponding to a frequency of 40 Hz. The third task 56 may be associated to a processing period of 50 ms corresponding to a frequency of 20 Hz. A first communication path may have provided from the path detection module 231 detecting the first communication path as a result of the first task 53 associated to export the first data variable for subsequent import by the fourth task 62. The major processing period may be detected by computing the LCM of the processing periods associated to the first task 53, third task 56 and fourth task 62 resulting in major processing period 110 of 50 ms. A first start point T11 of the first partition 50 in a first minor processing period 125 of the major processing period 110 and a second start point T12 of the first partition 50 in a second minor processing period 126 of a major processing period 110 may be detected based on the processing order of the one or more partitions to be hosted on the first node S1. A first end point T21 of the first partition 50 in the first minor processing period 125 of the major processing period 110 may be detected based on the first start point T11 and the sum of the WCET of the first 53 and third task 56. A first start point T12 of the first partition 50 in the second minor processing period 126 of a major processing period 110 may be detected on the processing order of the one or more partitions to be hosted on the second node S2. A communication window associated to the first communication path can then either be detected by the communication requirement detection module 232 between the endpoint T21 of the first partition 50 to the start point T12 of the first partition 50 in a subsequent minor processing period 126 corresponding to a first communication windows CW1 or between the endpoint T21 of the first partition 50 to the start point T32 of the second partition 60 corresponding to a second communication windows CW2.

In one example to the number of additional modules may comprise a scheduling module 245 arranged allocate communication of the data messages M1-M2 into the communication time-slots based on processing information related to the detected communication time window associated to each of the detected communication paths and the protocol associated to the at least one network 2.

In one example the scheduling module 245 may be arranged to allocate communication of the data messages M1-M2 into at least one of the plurality of communication time-slots SL1-SL12 based on the at least one communication window associated to communication of each of the data messages M1-M2 along each detected communication path.

The scheduling module 245 may be arranged to allocate communication of data messages M1-M2 based on detecting communication windows defining endpoints within each of the minor bus periods associated to the major processing period 110.

The scheduling module 245 may be arranged to start allocating communication of the data messages M1-M2 in order from the last minor bus period in the major bus period and proceeding backwards to the first minor bus period. The scheduling module 245 can be arranged to allocate the data message into the communication time-slot SL1-SL12 as late as possible within each of the minor bus periods based on requirements determined from endpoints of the communication windows defining an endpoint within the respective minor bus period.

In one example the scheduling module 245 can be arranged to control when allocating communication of each data message into one of the communication time-slots that each allocation comply with network protocol and hardware restrictions, such as for example that the data payload i.e. bit size is available in the communication time-slot and that the communication time-slot is not allocated to a inter frame gap or synchronization frame.

As an example relating to a case where the major bus period 110 comprise a sequence of a first minor bus period 125 with an associated first set of communication time-slots comprising six communication time-slots SL1-SL6 and a second minor bus period 126 with an associated second set of communication time-slots comprising six communication time-slots SL7-SL12. The scheduling module 245 may start to allocate communication of data messages associated to the detected communication windows CW1-CW2 defining endpoints in the second minor bus period 126. The scheduling module 245 may then allocate communication of data messages associated to the detected communication windows defining endpoints in the first minor bus period 126 with an associated first set SL1-SL6 of communication time-slots. The scheduling module 245 can allocate communication of the data message associated to the first communication window CW1 into a sixth communication time-slot SL6 or a fifth communication time-slot SLS communication time-slot associated to the first set of communication time-slots SL1-SL6.

In case the scheduling module 245 fail to provide a set of allocations of data messages into communication time-slots in accordance with the detected communication time windows the configuration files associated to system timing and/or node assignment can be modified by an automatic or manual procedure so as to provide means for the scheduling module 245 to provide a set of allocations of data messages into communication time-slots in accordance with the detected communication time windows.

In one example the scheduling module 245 may be arranged to perform various optimization procedures when allocating communication of the data messages into the plurality of communication time-slots. For example several of the data messages M1-M2 can be merged into one of the plurality of communication time-slots SL1-SL12, so as to optimize network utilization, based on information related to the detected communication time windows, the detected data bit size for each data message and properties of the network related to bandwidth extracted from the configuration file X1 associated to system hardware.

As a result of the operations of the scheduling module 245 a bus schedule may be generated automatically off-line for each of the nodes S1-S4 as a static description of the network transactions within a major bus period that is periodically repeated. The bus schedule is statically determined i.e. it is predetermined from the allocation of each of the one or more data messages M1-M2 into the plurality of communication time-slots SL1-SL12 when each of the one or more data messages M1-M2 is sent onto the network 2. It is further predetermined which of the one or more data messages that comprise which one or more data variable. The bus schedule can be generated for a predetermined distributed avionics computer system based on configuration files comprising configuration data associated to configuration of hardware and software.

In one example the scheduling module 245 may generate one or more configuration file associated to a system schedule for each of the nodes S1-S4.

In one example the number of additional modules may comprise a data message packet module 240 arranged to provide packing/un-packing instructions based on processing the bit size of the data messages provided from the message module 235, the one or more configuration files X31-X32 associated to data messages and the one or more configuration files X51-X52 associated to applications. As an example the packing/un-packing instructions may relate to which of the one or more data variables to provide into which one or more data message M1-M2 from which one of the one or more applications and how. The packing/un-packing instructions may also relate to which of the one or more data variables to extract from which one or more data message M1-M2 into which one of the one or more applications and how.

In one example the data message packet module 240 may based the one or more configuration files X31-X32 associated to data messages and the one or more configuration files associated to applications X51-X52 detect a need for conversion of data types between different programming languages such as for example between a first data type declared in C++ associated to a first application and a second data type declared in ADA associated to a second application.

In one example the number of additional modules may comprise a configuration data generation module 250 arranged to provide machine readable configuration data SC1-SC3 associated to connectivity, based on processing data provided from the message packet module 240 and the one or more configuration file associated to a system schedule provided from the scheduling module 245. The machine readable configuration data SC1-SC3 associated to connectivity may comprise instructions relating to I/O traffic for control of various I/O mechanisms arranged to operate within the distributed avionics computer system such as for example at least an I/O partition or dedicated I/O processing device associated to the each of the nodes S1-S4.

In one example the machine readable configuration data SC1-SC3 may be separate machine readable configuration data, such as for example first machine readable configuration data SC1 associated to the first node S1, second machine readable configuration data SC2 associated to the second node S2 and third machine readable configuration data SC3 associated to the third node S3.

The machine readable configuration data associated to connectivity may be stored in one or more portions of the memory 3 or one or more additional memories associated to each node S1-S4. Modifications of or additions to the configuration data associated to connectivity can be uploaded to the respective memory 3 of the nodes S1-S4 during system design, operation or at maintenance.

As an example the instructions relating to I/O traffic for control of various I/O mechanisms may comprise instructions on which data port to retrieve data variables, how to convert data variables arranged to be exported from a first application written in ADA hosted on a first node S1 into a suitable format for transmission onto the at least one network 2 in a predetermined time-slot of for example the periodically repeating TDMA type schedule and how to convert the data variables for importing via at least a second data port into to a second application written in C++ hosted on a second node S2.

In one example the operational tools comprise additional modules arranged to process the configuration files provided in the configuration file module 210 to provide additional machine readable configuration data associated to data switches associated to the at least one network and/or the at least one RTOS, such as for example to the CDM 40 associated to each of the nodes S1-S4.

In one example modification of the configuration of the distributed avionics computer system related to a specific application regarding providing an additional data variable to be imported from an already existing data message can be performed. This modification comprises modifying the configuration file related to the application to be modified. Hence the process of adding the data variable to be imported to an application involves modifying a single configuration file, associated to the specific application.

In one example modification of the configuration of the distributed avionics computer system related to a specific application regarding providing an additional data variable to be imported from an already existing data message and to provide an additional data variable to be exported from the application to an existing data message can be performed. This modification comprise modifying the configuration file associated to the application to be modified, the configuration file associated to the respective data message associated to the additional data variable to be exported and possibly the one or more configuration file associated applications intended to be configured to import the additional data variable.

In one example in a case wherein the message module 235 has added the overhead bit size to each of the data bit sizes associated to the data messages M1-M2 and wherein the scheduling module 245 has performed processing to provide the one or more configuration file associated to a system schedule based on the added overhead bit size, modification of the one or more configuration file X31-X32 associated to data messages and/or the one or more configuration file associated X51-X52 to applications can be made without processing the modified configuration files in the scheduling module 245. The modified configuration files can then be processed by the data message packet module 240 to provide modified information to the configuration data generation module 250 so as to provide modified machine readable configuration data SC1-SC3 associated to connectivity. Wherein the modified machine readable configuration data SC1-SC3 is provided based on the modified configuration files from the data message packet module 240 and un-modified configuration files from the scheduling module 245.

In one example the operational tools comprise a non-volatile memory, a data processing device such as a microprocessor and a read/write memory. The non-volatile memory has a first memory portion wherein a computer program, such as an operating system, is stored for configuring synchronous table-driven operations of the distributed avionics computing system. Further, the operational tools comprises a bus controller, a serial communication port, I/O-means, an A/D-converter, a time date entry and transmission unit, an event counter and an interrupt controller. The non-volatile memory also has a second memory portion.

A computer program comprising routines for configuring synchronous table-driven operations of the distributed avionics computing system is provided. The program may be stored in an executable manner or in a compressed state in a separate memory and/or in the read/write memory.

When it is stated that the data processing device performs a certain function it should be understood that the data processing device performs a certain part of the program which is stored in separate memory, or a certain part of the program which is stored in read/write memory.

The data processing device may communicate with a data port by means of a first data bus. The non-volatile memory is adapted for communication with the data processing device via a second data bus. The separate memory is adapted to communicate with data processing device via a third data bus. The read/write memory is adapted to communicate with the data processing device via a fourth data bus.

When data is received on the data port it is temporarily stored in the second memory portion. When the received input data has been temporarily stored, the data processing device is set up to perform execution of code in a manner described above. According to one example, data received on the data port comprises information regarding the hardware and software configuration of the distributed avionics computer system. The information received on the data port may comprise the set of configuration files X1-X2, X31-X32, X4 and X51-X52. This information can be used to provide configuration data by the operational tools in order to configure synchronous table-driven operations of the nodes S1-S4 interconnected in the network 2, as described above.

An example of the invention relates to a computer programme comprising a programme code for performing the method steps depicted with reference to FIG. 10, when the computer programme is run on a computer.

An example of the invention relates to a computer programme product comprising a program code stored on computer-readable media for performing the method steps depicted with reference to FIG. 10, when the computer programme is run on the computer.

An example of the invention relates to a computer programme product directly storable in an internal memory of a computer, comprising a computer programme for performing the method steps depicted with reference to FIG. 10, when the computer programme is run on the computer.

FIG. 10 schematically illustrates a flow diagram of a method according to an example of the present invention. This example relates to configuring synchronous table-driven operations of a distributed avionics control system comprising a plurality of processing nodes S1-S4 interconnected in a network 2.

In a first method step S110 providing system characteristics is performed i.e. the set of configuration files X1-X2, X31-X32, X4 and X51-X52 is provided with information associated configuration of the set of applications and hardware associated to the distributed avionics computer system. After the method step S110 a subsequent method step S120 is performed.

In the method step S120 communication paths are detected. This means that the operational tools processes the set of configuration files to detect data paths between tasks associated to different applications hosted on different nodes S1-S4 arranged to exchange data variables. After the method step S120 a subsequent method step S130 is performed.

In the method step S130 communication requirements are detected along each of the detected communication paths. This means that a periodically repeating communication window is detected, defining a time frame for when a data message comprising at least one data variable can be scheduled for transmission along each of the detected communication paths via the at least one network 2. After the method step S130 a subsequent method step S140 is performed.

In the method step S140 the data messages are allocated into a plurality of time-slots. The data messages may be allocated statically into a plurality of time-slots of a TDMA protocol comprising a plurality of time-slots defined within a major communication time-frame based on the detected communication window associated to each of the data messages, wherein the TDMA protocol is associated to the at least one network 2. After the method step S140 a subsequent method step S150 is performed.

In the method step S150 a system configuration is generated. The system configuration is generated based on the allocation of the data messages into the plurality of time-slots and relates to configuration data associated to communication. The system configuration may be generated as separate configuration data for each of the system nodes S1-S4. After the method step S150 a subsequent method step S160 is performed in the illustrated example. In the method step S160 the system configuration is provided to the distributed avionics computer system so as to provide synchronous table driven-operations. After the method step S160 the method may end. In one example the method may be repeated starting with the method step S110 to perform a new configuration or a modified configuration based on modification of the hardware and/or software associated to the distributed avionics computer system.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A method for configuring synchronous table-driven operations of a distributed avionics control system said method comprising the steps of:

providing a global timing configuration file (X4), said global timing configuration file comprising information of a set of predetermined system global periodically repeating processing periods, and a plurality of communication time-slots (SL1-SL12);

providing a plurality of application configuration files (X51-X52), said plurality of application configuration files comprising information associating to each of a plurality of applications (51-52, 61) at least one processing subcomponent (53, 55-56, 62-63), wherein the at least one processing subcomponent is associated to at least one unit of data to be periodically imported into the at least one processing subcomponent or exported from the at least one processing subcomponent and a processing period identified from the set of predetermined system global repeating processing periods of the global timing configuration file;

providing a node assignment configuration file (X2), said node assignment configuration file comprising information identifying assignment of each of the plurality of applications to a plurality of processing nodes (S1-S4) interconnected in a network (2) of a vehicle, wherein the plurality of processing nodes are arranged to execute the plurality of applications and the at least one processing subcomponent associated to each of the plurality of applications;

detecting data communication paths, based on processing information from the node assignment configuration file and the plurality of application configuration files so as to detect a plurality of communication paths formed between at least a first processing subcomponent, associated to at least a first unit of data, to be periodically exported and at least a second processing subcomponent associated to a different application than said first processing subcomponent, wherein said at least first unit of data is intended to be periodically imported into said at least second processing subcomponent;

detecting communication requirements, associated to delay constraints along the detected communication paths, based on processing information from the plurality of application configuration files and information from the detected data communication paths relating to the processing period associated to the processing subcomponents, forming data communication paths, so as to detect a periodic communication window (CW1-CW2) for at least one data message comprising the at least one unit of data to be periodically exported by the at least one processing subcomponent associated to each of the plurality of applications along each of the plurality of detected communication paths;

generating a system schedule configuration file, by allocating to the plurality of communication time-slots (SL1-SL12) as defined by the global system timing configuration file, communication of the at least one data message (M1-M2), based on information from the detected communication requirements relating to the at least one detected communication time window along each of the detected communication paths;

generating system configuration data based on information from the system schedule configuration file, said generation comprising providing system tables associated to each of the plurality of processing nodes (S1-S4), each system table comprising a network communication schedule;

providing the system configuration data to the plurality of processing nodes (S1-S4) of the distributed avionics control system; and periodically and based upon the provided system configuration data, at least one of importing or exporting, via the plurality of processing nodes (S1-S4), the at least one unit of data into or from the at least one processing subcomponent.

2. Method according to claim 1, wherein:

the step of providing a plurality of application configuration files further comprises providing information on worst case processing time associated to each of the at least one processing subcomponent; and the step of providing a node assignment configuration file further comprises the steps of providing information identifying at least one partition assigned to each of the plurality of processing nodes and assignment of each of the plurality of applications to one of the at least one partition.

3. Method according to claim 1, wherein the set predetermined periodically repeating processing periods comprise a fundamental periodically repeating processing period (125) and integer multiples of the fundamental periodically repeating processing period.

4. Method according to claim 3, further comprising the step of:

detecting a partition processing time-frame for each of the at least one partition associated to each of the plurality of processing nodes (S1-S4), based on processing the worst case processing time of the processing subcomponents, associated via the application configuration file to the at least one partition;

wherein the partition processing time-frame statically define a start and stop time within each fundamental periodically repeating processing period; and wherein the processing subcomponents are arranged to be processed in a rate monotonic order within the associated partition.

5. Method according to claim 4, wherein the step of generating a system schedule configuration file comprises processing the periodic communication window along each of the plurality of detected communication paths, so as to statically allocate the at least one data message to at least one of the plurality of communication time-slots, over a repeating major processing period (110) defined by the least common multiple of the set of predetermined periodically repeating processing periods, based on the stop time of the partition and the processing period of the at least first processing subcomponent having associated the at least first unit of data to be periodically exported and either the start time of the partition of the at least second processing subcomponent having associated said at least first unit data to be imported or the start time of the partition in a subsequent fundamental periodically repeating processing period of the at least first processing subcomponent.

6. Method according to claim 1, further comprising the step of:

providing a system hardware topology configuration file (X1), comprising information identifying the processing nodes (S1-S4) and network connections between said processing nodes (S1-S4); and wherein the step of detecting data communication paths further comprises processing the system hardware topology configuration file (X1) so as to generate routing data for each detected communication path.

7. Method according to claim 1, further comprising the step of:

providing at least one data message configuration file (X31-X32), each comprising information identifying the at least one data message and an associated number of data message subcomponents, each associated via the plurality of application configuration files to one of the at least one unit of data to be periodically exported or imported, associated to the at least one processing subcomponent; and wherein the at least one data message configuration file further comprises information identifying a data type associated to each of the number of data message subcomponents.

8. Method according to claim 7, further comprising the step of:

detecting a data message bit size for each of the at least one data message, based on processing the at least one data message meta-data component; and wherein the step of generating a system schedule configuration file, further is based on the detected data message bit size for each of the at least one data message.

9. Method according to claim 8, further comprising the step of:

detecting format conversion data, based on processing the at least one data message configuration file and the detected data bit size for each of the at least one data message; and wherein the step of generating a system configuration, further is based on the detected format conversion data so as to provide format conversion instructions related to packing and/or un-packing of the at least one data message.

10. Method according to claim 7, further comprising the step of:

adding an overhead bit size to the detected bit size of each of the data messages before performing the step of generating a system schedule configuration file; and wherein modifying a parameter of one of the plurality of application configuration files after having performed the step of generating a system schedule meta-data component causes an additional unit of data to be imported by the at least one associated processing subcomponent without performing a renewed step of generating a system schedule configuration file.

11. Method according to claim 1, wherein modifying a parameter associated to one of the plurality of application configuration file causes the associated application to move to a different processing node (S1-S4) without modifying the associated application.

12. Method according to claim 1, wherein at least one of the steps associated to providing meta-data components comprises providing information in a general markup language file format.

13. A non-transitory computer program product comprising at least one computer-readable storage medium having computer-readable program code portions embodied therein, the computer-readable program code portions comprising at least one executable portion configured for performing the steps of claim 1.

* * * * *